(12) United States Patent
Malkowski, Jr. et al.

(10) Patent No.: US 7,081,735 B1
(45) Date of Patent: Jul. 25, 2006

(54) SYSTEM AND METHOD FOR BYPASSING A MOTOR DRIVE

(75) Inventors: Chester Malkowski, Jr., Franklin, WI (US); G. Erich Heberlein, Jr., Everett, WA (US); Gary P. Bruski, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/663,229

(22) Filed: Sep. 16, 2003

(51) Int. Cl.
*H02P 23/00* (2006.01)
*H02P 25/00* (2006.01)
*H02P 27/00* (2006.01)
*H02P 27/04* (2006.01)

(52) U.S. Cl. .................... 318/807; 318/723
(58) Field of Classification Search ........ 318/805–807, 318/811, 254, 780; 363/51, 64, 131, 132, 363/153, 98; 290/38; 322/10, 61
See application file for complete search history.

(56) References Cited

U.S. PATENT DOCUMENTS

| | | | | |
|---|---|---|---|---|
| 4,082,988 A * | 4/1978 | Reime et al. | ............... | 318/139 |
| 4,096,423 A * | 6/1978 | Bailey et al. | ............... | 318/370 |
| 4,447,767 A * | 5/1984 | Holt | ............... | 318/139 |
| 4,486,698 A * | 12/1984 | Blumner | ............... | 318/721 |
| 4,599,519 A * | 7/1986 | Boenig | ............... | 307/22 |
| 4,609,858 A * | 9/1986 | Sugita et al. | ............... | 318/778 |
| 4,626,698 A * | 12/1986 | Harnden et al. | ............... | 307/38 |
| 4,743,777 A * | 5/1988 | Shilling et al. | ............... | 290/46 |
| 4,841,216 A * | 6/1989 | Okada et al. | ............... | 322/10 |
| 4,939,441 A * | 7/1990 | Dhyanchand | ............... | 318/718 |
| 4,978,826 A * | 12/1990 | DeRuiter et al. | ............... | 219/771 |
| 4,982,123 A * | 1/1991 | Raad | ............... | 310/68 D |
| 4,992,721 A * | 2/1991 | Latos | ............... | 322/10 |
| 5,008,801 A * | 4/1991 | Glennon | ............... | 363/132 |
| 5,055,700 A * | 10/1991 | Dhyanchand | ............... | 290/31 |
| 5,068,590 A * | 11/1991 | Glennon et al. | ............... | 322/10 |
| 5,097,195 A * | 3/1992 | Raad et al. | ............... | 322/10 |
| 5,130,628 A * | 7/1992 | Owen | ............... | 318/780 |
| 5,212,438 A * | 5/1993 | Miyazaki et al. | ............... | 318/805 |
| 5,317,117 A | 5/1994 | Bruski et al. | ............... | 200/144 R |
| 5,350,992 A * | 9/1994 | Colter | ............... | 318/807 |
| 5,503,260 A * | 4/1996 | Riley | ............... | 191/4 |
| 5,594,322 A * | 1/1997 | Rozman et al. | ............... | 322/10 |
| 5,920,467 A * | 7/1999 | Bowyer et al. | ............... | 363/37 |
| 6,064,173 A * | 5/2000 | Bock | ............... | 318/716 |
| 6,078,160 A * | 6/2000 | Cilluffo | ............... | 318/641 |
| 6,239,513 B1 * | 5/2001 | Dean et al. | ............... | 307/64 |
| 6,246,207 B1 * | 6/2001 | VanSistine et al. | ............... | 318/801 |
| 6,487,091 B1 | 11/2002 | Malkowski, Jr. et al. | ............... | 361/826 |
| 6,775,117 B1 * | 8/2004 | Wodrich et al. | ............... | 361/56 |
| 6,801,013 B1 * | 10/2004 | Woodward et al. | ............... | 318/804 |

(Continued)

*Primary Examiner*—Marlon T. Fletcher
*Assistant Examiner*—Renata McCloud
(74) *Attorney, Agent, or Firm*—Patrick S. Yoder; Alexander M. Gerasimow (57) ABSTRACT

A motor control system comprising a plurality of motor controllers and a power source adapted to drive an electric motor. The motor control system comprises a switch that is selectively operable between at least a first position and a second position. In the first position, the power source is coupled to a first controller to provide the power to drive the electric motor. In the second position, the power source is coupled to a second controller to provide the power to drive the electric motor. The switch also electrically isolates the input and the output of the first controller from the power source when the manual bypass switch is positioned in the second position.

21 Claims, 5 Drawing Sheets

U.S. PATENT DOCUMENTS

| | | | |
|---|---|---|---|
| 6,900,606 B1 * | 5/2005 | Youm | 318/375 |
| 6,956,751 B1 * | 10/2005 | Youm et al. | 363/37 |
| 2002/0048161 A1 | 4/2002 | Malkowski et al. | 361/826 |
| 2003/0049958 A1 | 3/2003 | Bruski et al. | 439/344 |
| 2003/0051175 A1 | 3/2003 | Heberlein, Jr. et al. | 713/300 |
| 2003/0051176 A1 | 3/2003 | Heberlein, Jr. et al. | 713/300 |
| 2003/0072144 A1 | 4/2003 | Malkowski, Jr. et al. | 361/826 |
| 2004/0067049 A1 * | 4/2004 | Woodward et al. | 388/801 |

* cited by examiner

SYSTEM AND METHOD FOR BYPASSING A MOTOR DRIVE

BACKGROUND OF THE INVENTION

1. Field of the Invention

The present invention relates generally to the field of electric motor controllers. More particularly, the invention relates to a technique for selectively connecting an electric motor to a variable frequency motor drive and a second electric power source.

2. Description of the Related Art

Electric motors are utilized in a number of different industrial applications. For example, a motor may be utilized to drive a conveyor belt used to transport materials. In some applications, it may be desirable to vary the speed of the motor. In the above example, it may be desirable to vary the speed of the motor so as to vary the speed of the conveyor belt and, consequently, vary the amount of material that is transported.

Typically, the speed of a polyphase induction motor depends upon the frequency of the electricity used to power the motor. Electric motors commonly are powered from a conventional power line, such as single-phase or three-phase AC operating at 60 Hz. Because these motors receive power at a single frequency, they typically operate at a single speed. Alternatively, motors may be powered by a variable frequency drive. A typical variable frequency drive receives power at a fixed frequency, e.g. 60 Hz AC, and produces a variable frequency output that is used to power the motor. By varying the frequency of the power to the motor the speed of the motor is varied.

Motor controllers that utilize a variable frequency drive to power an electric motor may have a bypass circuit to enable the variable frequency drive to be bypassed. Thus, instead of being powered by the output of the variable frequency drive, the electric motor may be powered by an alternate device connected to the input supply of the variable frequency drive. Bypassing the variable frequency drive enables power to the variable frequency drive to be removed but permits further operation of the motor while power is removed from the variable frequency drive. This enables maintenance to be performed on the variable frequency drive while the motor is operating. However, even with the variable frequency drive bypassed, voltage may still be present in or near the variable frequency drive. This voltage presents a safety hazard to a person attempting to perform maintenance on the variable frequency drive. There is a need, therefore, for an improved technique for bypassing power for a motor around a variable frequency drive.

SUMMARY OF THE INVENTION

A motor control system comprising a plurality of motor controllers and a power source adapted to drive an electric motor. One of the controllers may be a variable frequency drive. Another controller may be a contactor with overload protection. The motor control system includes a bypass switch that is selectively operable between a first position and a second position. In the first position, the power source is coupled to the first controller to provide the power to drive the electric motor. In the second position, the power source is coupled to the second controller to drive the electric motor. The bypass switch also electrically isolates the input and the output of the first controller from the power source when the bypass switch is positioned in the second position.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
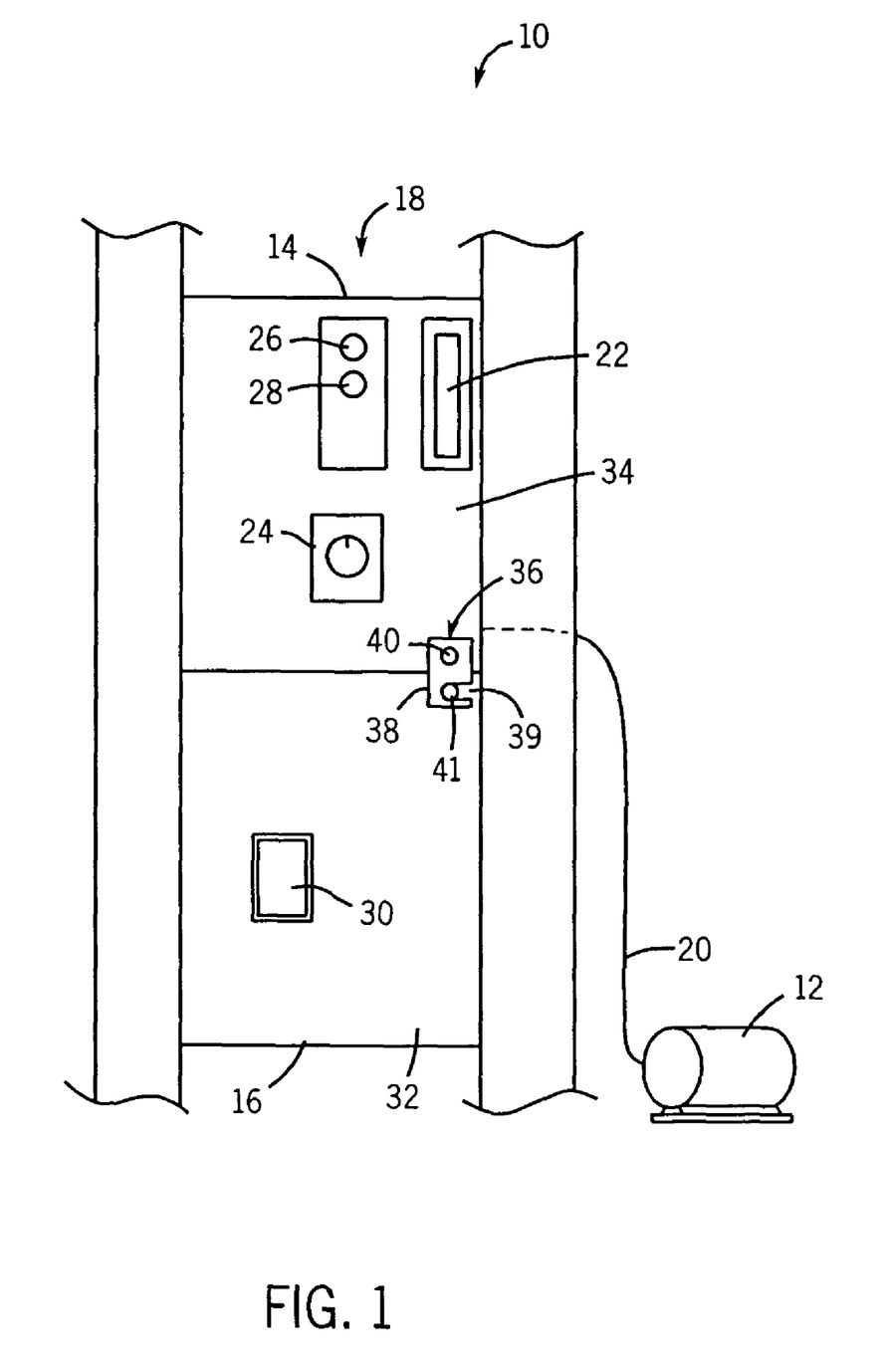
FIG. 1 is an elevation view of an electric motor control system, in accordance with an embodiment of the present technique.

Referring generally to FIG. 1, an electrical system is illustrated, as designated generally by reference numeral 10. In the illustrated embodiment, the electrical system comprises a motor 12, a motor controller 14, and a variable frequency drive unit 16. The motor controller 14 controls the application of power to the motor 12. The variable frequency drive unit 16 is adapted to provide a variable frequency output to the motor 12. By controlling the frequency of the power to the motor 12, the speed of the motor 12 may be controlled. In the illustrated embodiment, the motor controller 14 and variable frequency drive unit 16 are installed within a motor control center 18. However, the motor controller 14 and variable frequency drive unit 16 may be installed in various other electrical systems. In addition, the motor controller 14 and variable frequency drive unit 16 are illustrated in a vertical relationship. However, the motor controller 14 and variable frequency drive unit 16 may be oriented in a side-by-side, or other arrangement.

Conductors 20 are used to electrically couple the motor controller 14 to the motor 12. In the illustrated embodiment, the motor controller 14 receives power from an electric bus within the motor control center 18. The illustrated motor controller 14 has a disconnect 22 that controls power to the motor controller 14 from the electric bus within the motor control center 18. The electric bus is operable to provide power to the variable frequency drive unit 16 to enable the variable frequency drive unit 16 to produce a variable frequency output to drive the motor 12. The motor controller 14 also is adapted to bypass the variable frequency drive unit 16 and supply power directly to the motor 12 from the electric bus. Bypassing the variable frequency drive unit 16 enables power to be removed from the line and load side of the variable frequency drive unit 16, permitting further operation of the motor 12. Removing power from the variable frequency drive unit 16 enables maintenance to be performed on the variable frequency drive unit 16 while the motor is still running.

In the illustrated embodiment, the motor controller 14 comprises a manual bypass switch 24 that is operable to select the source of power to the electric motor 12. In a first or "drive" position of the manual bypass switch 24, power is provided to the motor 12 from the variable frequency drive unit 16. In a second or "bypass" position of the manual bypass switch 24, power is bypassed around the variable frequency drive unit 16 and supplied to the motor 12 through a bypass contactor 47 and overload protection 48. In addition, the input and output of the variable frequency drive is electrically isolated from the electric bus. In the illustrated embodiment, the manual bypass switch 24 is a double-break switch. The motor controller 14 has a "Drive On" light 26 that is illuminated when power is provided to the variable frequency drive unit 16. The motor controller 14 also has a "Bypass On" light 28 that is illuminated when the variable frequency drive unit 16 is bypassed and bus power is applied to the motor 12 through a bypass contactor 47 and overload protection 48. In addition, the variable frequency drive unit 16 has a programming module 30 that is operable to control the operation of the variable frequency drive unit 16.

In the illustrated embodiment, a movable cover 32 is provided to enable access to the variable frequency drive unit 16. The motor controller 14 also has a movable cover 34 to enable access to the interior of the motor controller 14. An interlock 36 is provided to prevent the cover 32 of the variable frequency drive unit 16 from being opened without also opening the cover 34 of the motor controller 14. In the illustrated embodiment, power to the motor controller 14 is turned off when the cover 34 of the motor controller 14 is opened. However, in the illustrated embodiment, the interlock 36 is adapted to be defeatable, i.e., the interlock 36 is adapted so that the variable frequency drive cover 32 may be opened without having to open the motor controller cover 34. The interlock 36 has a plate 38 that extends over the cover 32 of the variable frequency drive unit 16 and the cover 34 of the motor controller 14. The plate 38 has a notch 39. A first member 40 is provided to secure the plate 38 to the motor controller cover 34 and a second member 41 is provided to secure the plate 38 to the variable frequency drive cover 32, preventing the variable frequency drive cover 32 from being opened without having to open the motor controller cover 34. However, the notch 39 in plate 38 enables the plate 38 to be rotated so that it no longer extends over the cover 32 of the variable frequency drive unit 16, thus, enabling the variable frequency drive cover 32 to be opened without having to open the motor controller cover 34. With the manual bypass switch 24 positioned in the "bypass" position, the variable frequency drive unit 16 is electrically isolated and the cover 32 may be opened to enable maintenance to be performed on the variable frequency drive unit 16.

Figure 2:
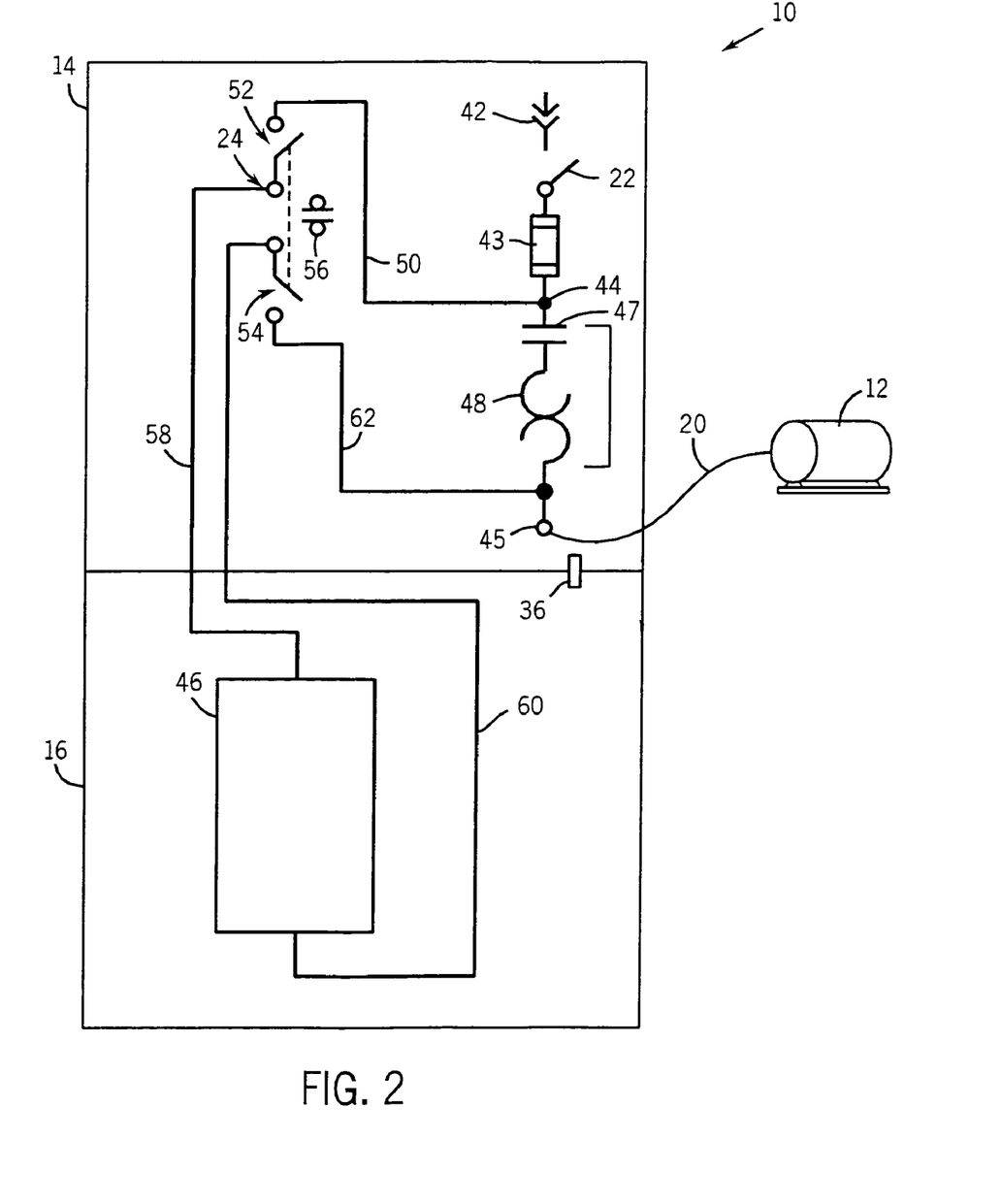
FIG. 2 is a one-line schematic of an electric motor system, in accordance with an embodiment of the present technique.

Referring generally to FIG. 2, a one-line electrical schematic of an embodiment of the system 10 is illustrated. In this embodiment, the one-line schematic is used to represent a three-phase system. However, the present techniques also are applicable to a single-phase system. In this embodiment, the motor controller 14 has a connector 42 that electrically couples the motor control system 10 to an electric power source. The disconnect 22 is operable to isolate the motor controllers 14, 16 from bus power. In the illustrated embodiment, a protection device 43, such as a fuse, is located in each phase downstream of the disconnect 22 to provide electrical protection for the system 10. Electricity flows from the bus through the connector 42, the disconnect 22, and fuses 43 to a node 44. The flow of electricity from the node 44 is established by the position of the manual bypass switch 24. In the illustrated embodiment, electricity can flow from the node 44 to a motor terminal 45 in one of two ways. If the manual bypass switch 24 is in the "drive" position, i.e., closed, electricity flows through the manual bypass switch 24 to a variable frequency drive 46 within the variable frequency drive unit 16. The output of the variable frequency drive unit 16 is coupled to a terminal 45 for connection to the motor 12. If the manual bypass switch 24 is in the "bypass" position, i.e., open, electricity is coupled through a bypass contactor 47 and overload protection 48 to the terminal 45.

Electricity flows from the node 44 to the manual bypass switch 24 via a first conductor 50. In the illustrated embodiment, the manual bypass switch 24 actually comprises a first set of contacts 52, a second set of contacts 54, and auxiliary contacts 56. The first set of contacts 52 is operable to electrically isolate the input of the variable frequency drive unit 16. The second set of contacts 54 is operable to electrically isolate the output of the variable frequency drive 46 so that voltage will not be present at the output of the variable frequency drive 46 via the terminal 45 when the variable frequency drive unit 16 is bypassed. The auxiliary contacts 56 are electrically connected to a circuit that controls the opening and closing of bypass contactor 47.

When the manual bypass switch 24 is positioned in the "drive" position, the first set of contacts 52 and the second set of contacts 54 are closed. Bus power flows to the variable frequency drive 46 via the first conductor 50, the first set of contacts 52, and a second conductor 58. The variable frequency drive unit 16, in turn, produces a variable frequency output that flows via a third conductor 60 through the second set of contacts 54 and a fourth conductor 62 to the motor terminal 45. From there, the variable frequency output flows to the motor 12. In addition, when the manual bypass switch 24 is positioned in the "drive" position, the auxiliary contacts 56 are open to prevent the bypass contactor 47 from closing and to prevent the bus power and the output of the variable frequency drive unit 16 from being electrically connected to the terminal 45 simultaneously.

When the manual bypass switch 24 is positioned in the "bypass" position, the first set of contacts 52 and the second set of contacts 54 are open, preventing bus power from flowing to the variable frequency drive unit 16. In addition, the auxiliary contacts 56 are closed to enable the bypass contactor 47 to be closed to enable bus power to be connected to the terminal 45. Bus power flows to the motor 12 through the terminal 45. When the second set of contacts 54 are open, the variable frequency drive 46 is isolated from the terminal 45 and voltage will not be present at the output of the variable frequency drive unit 16 via the third 60 and fourth 62 conductors.

Figure 3:
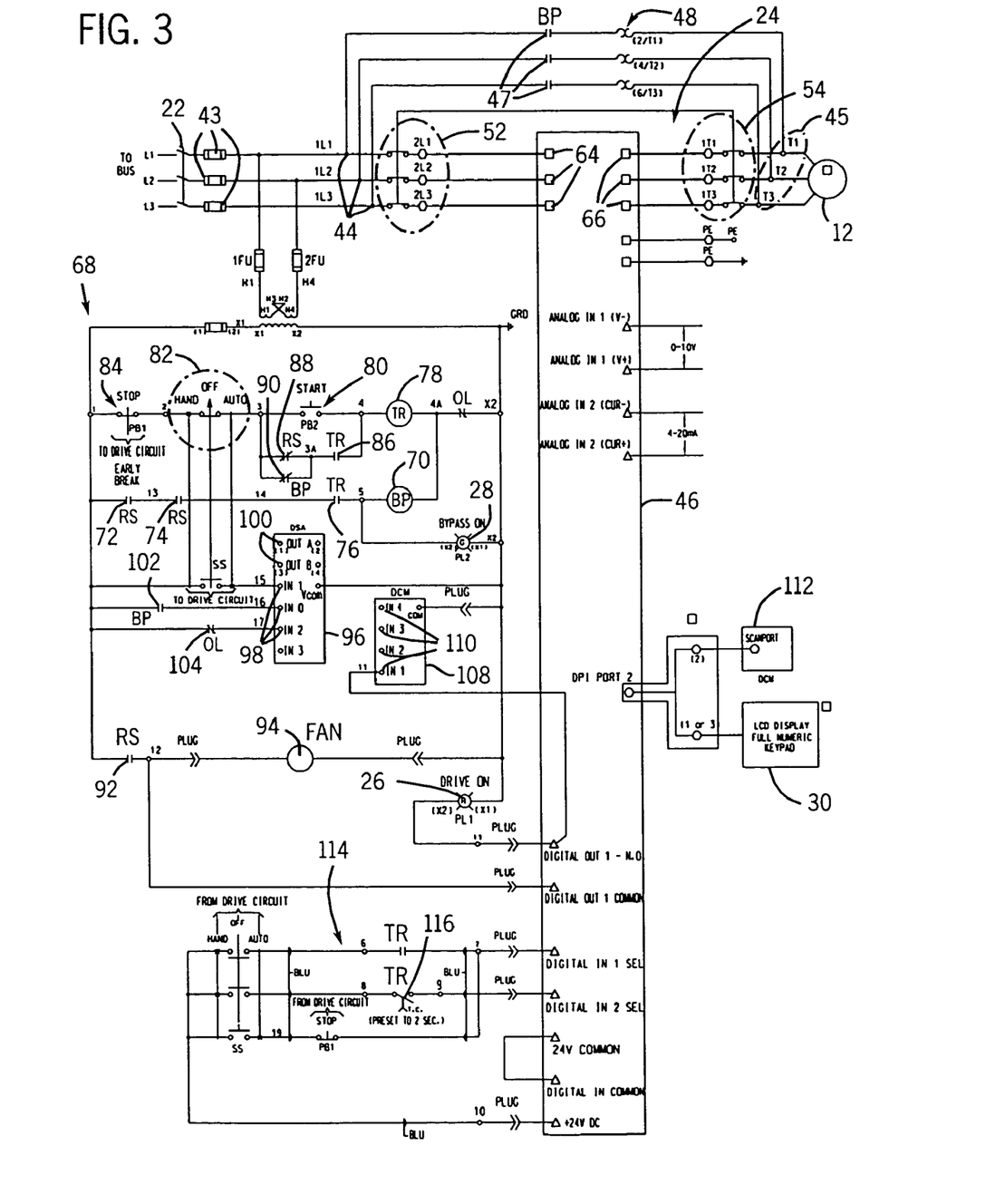
FIG. 3 is a detailed electrical schematic of a three-phase electric motor system oriented in a first mode of operation, in accordance with an embodiment of the present technique.
Figure 4:
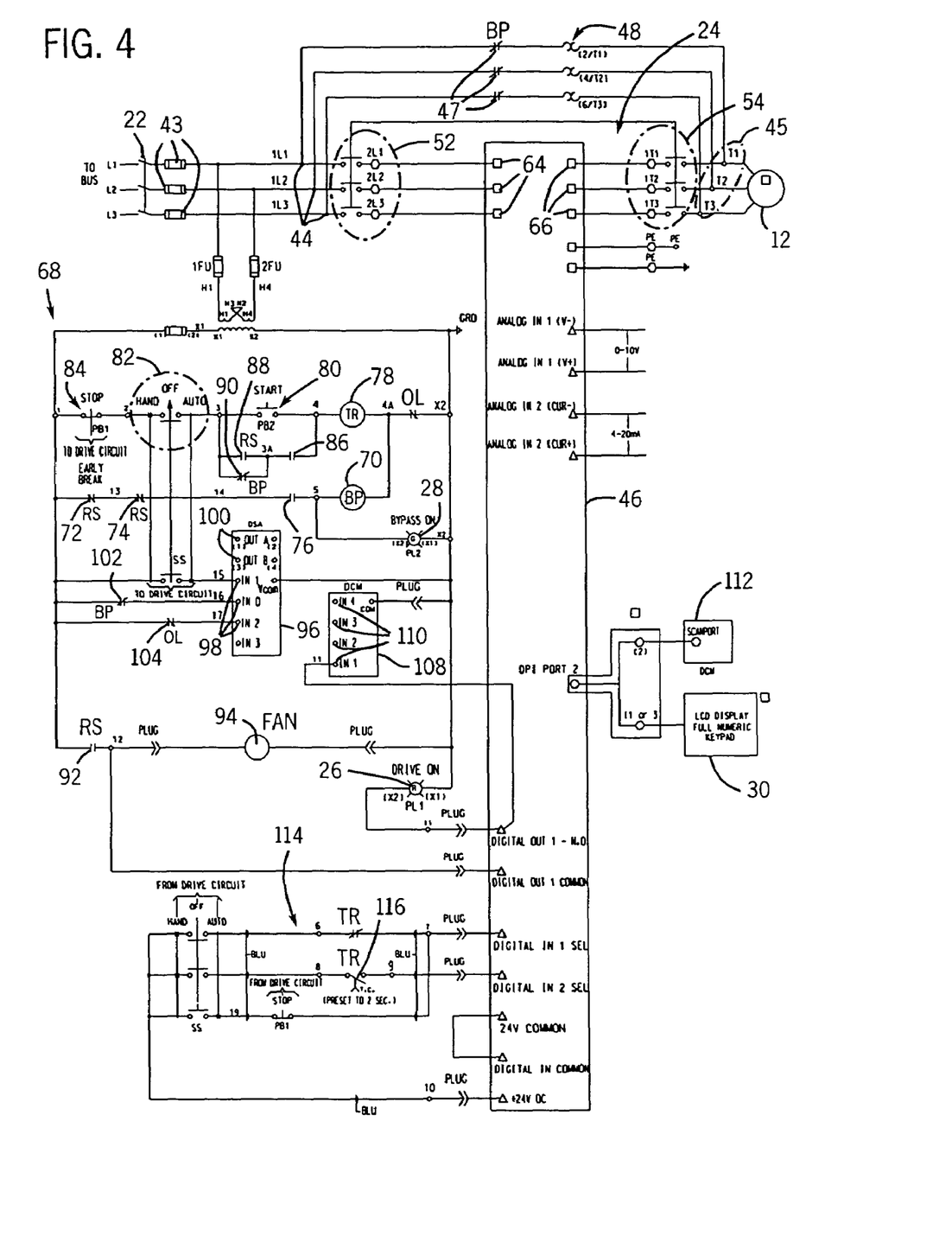
FIG. 4 is a detailed electrical schematic of the three-phase electric motor system of FIG. 3, the system being oriented in a second mode of operation.
Figure 5:
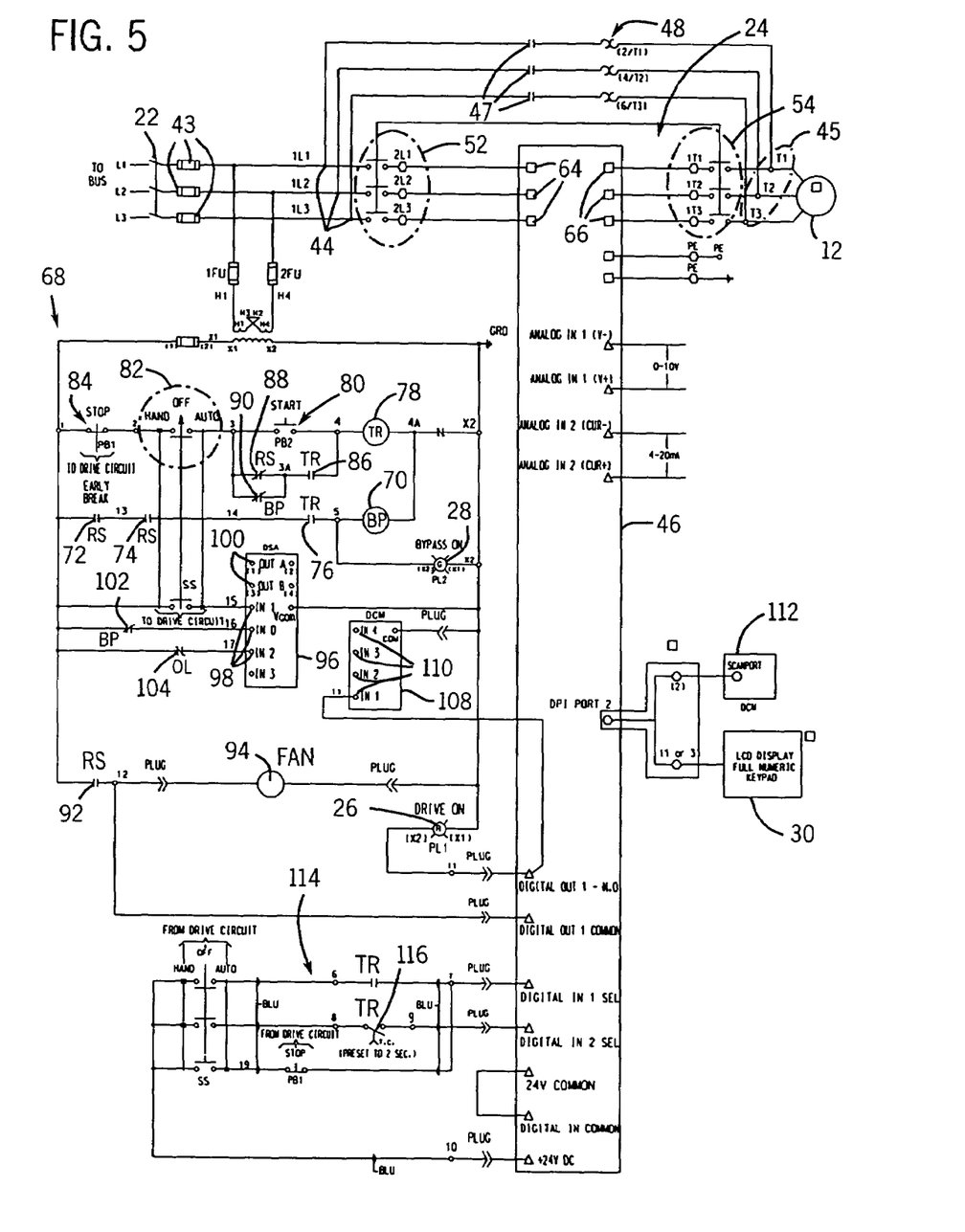
FIG. 5 is a detailed electrical schematic of the three-phase electric motor system of FIG. 3, the system being oriented in transition from the second mode to the first mode.

Referring generally to FIGS. 3–5, detailed electrical schematics of an embodiment of the present technique are illustrated. In the illustrated embodiment, motor 12 and bus power are three-phase AC. The bus power flows through first set of contacts 52 to input terminals 64 of the variable frequency drive 46. The variable frequency drive 46 produces a variable frequency output at terminals 66. The variable frequency output of the variable frequency drive 46 flows to the electric motor 12 through the second set of contacts 54 and terminals 45.

A control circuit 68 is used to control the application of power to the electric motor 12 in the illustrated embodiment. The control circuit 68 is operable to open bypass contacts 47 when the manual bypass switch 24 is positioned in the "drive" position. Conversely, the control circuit 68 is operable to close bypass contacts 47 when the manual bypass switch is positioned in the "bypass" position. The bypass contacts 47 are controlled by a bypass contactor 70 in the control circuit 68. In this embodiment, the bypass contacts 47 are normally-open contacts of bypass contactor 70, i.e., the bypass contacts 47 are open when the bypass contactor 70 is de-energized and the bypass contacts 47 are closed when the bypass contactor 70 is energized. However, the control circuit 68 may be configured so that normally-closed contacts may be used as bypass contacts.

The control circuit 68 utilizes auxiliary contacts of the manual bypass switch to control the energizing of the bypass contactor 70. In the illustrated embodiment, the auxiliary contacts of manual bypass switch comprise a plurality of contacts. First auxiliary contacts 72 and second auxiliary contacts 74 are electrically connected in series with the bypass contactor 70. The first and second auxiliary contacts 72, 74 are open when the manual bypass switch is positioned in the "drive" position to prevent the bypass contactor 70 from being energized. The first and second auxiliary contacts 72, 74 are closed when the manual bypass switch is positioned in the "bypass" position to enable the bypass contactor 70 to be energized. Furthermore, the first auxiliary contacts 72, are early-break contacts, i.e., they are adapted to open as soon as the manual bypass switch-is moved from the "bypass" position. The early-break feature ensures that the bypass contactor 70 is de-energized and the bypass contacts 47 open before the first set of contacts 52 and second set of contacts 54 of the manual bypass switch are closed, thereby preventing bus power and the output of the variable frequency drive unit 16 from being connected to the terminal 45 simultaneously. In the illustrated embodiment, in addition to the first and second bypass contacts 72, 74, first contacts 76 of a control relay 78 are electrically connected to the bypass contactor 70. The first contacts 76 of the control relay 78 are closed to enable bypass contactor 70 to be energized when the control relay 78 is energized.

In the illustrated embodiment, the energizing of the control relay 78 is controlled by a start switch 80, a hand-off-auto selector switch 82, and a stop switch 84. The stop switch 84 is normally-closed and is opened to stop operation of the motor 12. The hand-off-auto selector switch 82 is a three-position switch adapted to establish whether the motor 12 is started automatically (the "auto" position) or if the motor 12 is to be started manually (the "hand" position) when the position of the manual bypass switch is changed from "drive" to "bypass," and vice versa. The control relay 78 is de-energized when the hand-off-auto selector switch 82 is in the "off" position, preventing the motor 12 from being operated by either bypass contactor 70 or the variable frequency output of the variable frequency drive unit 16. The control relay 78 may be energized when the hand-off-auto selector switch 82 is in the "hand" or "auto" positions. The start switch 80 is a momentary switch that is closed to energize the control relay 78 and start operation of the motor 12. Once control relay 78 is energized, the start switch 80 may be released. Control relay contact 86, third auxiliary contact 88, and bypass contactor auxiliary contact 90 cooperate to keep control relay 78 energized after the start switch 80 is released. The third auxiliary contact 88 is closed when the manual bypass switch is in the "drive" position and the bypass contactor auxiliary contact 90 is closed when the bypass contactor 70 is energized. In the illustrated embodiment, the manual bypass switch has a fourth auxiliary contact 92 to control the energizing of a cooling fan 94 for the variable frequency drive unit 16. When the manual bypass switch is in the "drive" position, the fourth auxiliary contact 92 is closed to enable the fan 94 to be energized, thereby cooling the variable frequency drive unit 16.

In the illustrated embodiment, the control circuit 68 comprises a first module 96 to enable an external device, such as a programmable logic controller (PLC) or communications network, to communicate with the motor controller via a pre-established data protocol such as the DeviceNet protocol established by Allen-Bradley Company, LLC of Milwaukee, Wis. The first module 96 has a plurality of inputs 98 and outputs 100 for communicating data when the motor is operated in bypass mode. In this embodiment, an input 98 of the first module 96 is electrically coupled in series with a contact 102 of the bypass contactor 70, thereby providing an indication when the bypass contactor 70 is energized and power to the motor 12 is not being provided by variable frequency drive unit 16. Another input 98 is electrically coupled to the hand-off-auto selector switch 82. Another input 98 is coupled in series with an overload contact 104 of an overload protection device 48 electrically coupled in series with bypass contacts 47. The overload protection device 48 opens when an overload condition exists, preventing power from being provided to the motor 12 when operated in bypass mode. The overload contact 104 provides an indication to the first module 96 when the overload protection device 48 has opened.

In the illustrated embodiment, the control circuit 68 also comprises a second module 108 that enables an external device, such as a programmable logic controller (PLC) or communications network, to communicate with the motor controller when the motor is operated in variable frequency drive mode. The second module 108 comprises a plurality of inputs 110 to receive data, such as desired motor frequency, from the external device. Another connector 112 is provided to enable another external device to connect to the variable frequency drive. In the illustrated embodiment, a time delay circuit 114 is provided to provide a time delay for supplying power to the motor 12 from the variable frequency drive unit 16 when shifting operation from the bypass contactor 70 to the variable frequency drive unit 16. The time delay enables the variable frequency drive unit 16 to be fully operational before providing power to the motor 12. In the illustrated embodiment, the time delay circuit 114 has a time delay switch 116 that is controlled to change state a predetermined period of time after shifting operation to the variable frequency drive unit 16. Alternatively, the variable frequency drive unit 16 may be adapted to be programmed with a time delay.

As illustrated in FIG. 3, the first set of contacts 52 and second set of contacts 54 are closed when the manual bypass switch is positioned in the "drive" position. Bus power is coupled through the disconnecting means 22 and first set of contacts 52 to the input terminals 64 of the variable frequency drive unit 16. The variable frequency output of the variable frequency drive unit 16 is coupled from the output terminals 66 of the variable frequency drive unit 16 through the second set of contacts 54 and terminals 45 to the motor 12. First auxiliary contact 72 and second auxiliary contact 74 are open, preventing bypass contactor 70 from being energized. Consequently, bypass contacts 47 are open.

As illustrated in FIG. 4, the first set of contacts 52 and the second set of contacts 54 are open, isolating the input terminals 64 and output terminals 66 of the variable frequency drive unit 16 from bus power, when the manual bypass switch 24 is positioned in the "bypass" position. First auxiliary contact 72 and second auxiliary contact 74 are closed, energizing bypass contactor 70. Consequently, bypass contacts 47 are closed. Bus power is coupled through disconnecting means 22, bypass contacts 47, the overload protection device 48, and terminals 45 to the motor 12.

As illustrated in FIG. 5, the manual bypass switch is in the process of being repositioned from the "bypass" position to the "drive" position. First set of contacts 52 and second set of contacts 54 are open, isolating the input terminals 64 and output terminals 66 of the variable frequency drive unit 16 from bus power. During the first few degrees of rotation of manual bypass switch, early-break auxiliary contact 72 opens. This assures bypass contacts 47 are open before first set of contacts 52 and second set of contacts 54 are closed. No power is applied to the motor 12 by either the variable frequency drive unit 16 or the bypass contactor 70 in this transitional condition. This protects the motor 12, the motor controller 14, and the variable frequency drive unit 16 from the possibility of connecting the outputs of two different controllers to each other at the terminal 45, especially outputs having markedly different frequencies.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A motor control system for an electric motor, comprising:
    a bypass switch comprising:
        a first set of contacts electrically coupled in series between a power source and an input of a variable frequency drive;
        a second set of contacts electrically coupled in series between an output of the variable frequency drive and a load;
        an operator having a first position and a second position, wherein the first set of contacts and the second set of contact are closed when operator is oriented in the first position and the first set of contacts and the second set of contacts are open when the operator is oriented in the second position;
    a bypass contactor having a set of bypass contacts, wherein the set of bypass contacts is electrically coupled in parallel with the first set of contacts and the second set of contacts between the power source and the load; and
    the switch being configured to energize the bypass contactor and thereby close the set of bypass contacts when the first and second sets of contacts are open.

2. The system as recited in claim 1, wherein the operator is adapted to be selectively manually positioned in each of the first and second positions.

3. The system as recited in claim 1, further comprising a set of auxiliary contacts electrically coupled in series with the bypass contactor, the set of auxiliary contacts being adapted to open the set of bypass contacts when the first and second sets of contacts are closed.

4. The system as recited in claim 3, wherein the manual bypass switch is adapted to open the set of auxiliary contacts to de-energize the bypass contactor and open the third set of contacts before the first set of contacts and the second set of contacts are closed.

5. The system as recited in claim 1, comprising a disconnect adapted to control power to the motor controller from a source, wherein the first set of contacts is electrically coupled in series with the disconnect.

6. The system as recited in claim 1, comprising a terminal adapted to receive a conductor electrically coupled to the motor, wherein the second set of contacts and set of bypass contacts are electrically coupled to the terminal.

7. The system as recited in claim 1, comprising the variable frequency drive.

8. A motor control system, comprising:
    a variable frequency drive adapted to produce a variable frequency output to control the speed of a motor, the variable frequency drive comprising:
        an input to enable power from an external power source to be coupled to the variable frequency drive; and
        an output to enable the variable frequency drive to be coupled to the motor; and
    an electrical system operable to selectively couple the motor to the output of the variable frequency drive and the external power source, the electrical system being adapted to electrically isolate the input and the output of the variable frequency drive from the external power source when the motor is coupled to the external power source;
    wherein the electrical system comprises a manual bypass switch and a bypass contactor; the bypass contactor having at least one set of contacts electrically connected in parallel with the variable frequency drive and electrically connected in series between the external power source and the motor; and wherein the manual bypass switch has a first set of contacts electrically connected in series to the input of the variable frequency drive and a second set of contacts electrically connected in series to the output of the variable frequency drive.

9. The system as recited in claim 8, wherein the manual bypass switch comprises a double-break switch having an operator, wherein the first and second sets of contacts are closed when the operator is positioned in a first position and open when the operator is positioned in a second position.

10. The system as recited in claim 9, wherein the manual bypass switch comprises at least one auxiliary contact electrically connected in series with the bypass contactor, the auxiliary contact being a early-break contact.

11. The system as recited in claim 8, wherein the variable frequency drive is located in a first compartment of an enclosure and the manual bypass switch and bypass contactor is located within a second compartment of the enclosure.

12. The system as recited in claim 8, wherein the external power source is an electrical bus of a motor control center.

13. The system as recited in claim 8, wherein the electrical system is operable to provide a control signal to the variable frequency drive to establish a desired variable frequency output.

14. The system as recited in claim 13, wherein the electrical system is coupled to an external communication system to enable the desired variable frequency output to be established remotely via the external communication system.

15. A motor control system, comprising:
    a variable frequency drive adapted to produce a variable frequency output to control the speed of a motor;
    a bypass switch having first and second sets of contacts for electrically coupling the variable frequency drive to a external power source and to the motor, and a set of auxiliary contacts;
    a bypass contactor having a set of bypass contacts, the bypass contactor configured to be energized by the auxiliary contacts to electrically coupled the motor to the external power source such that the bypass contacts are electrically parallel to the variable frequency drive.

16. The motor control system of claim 15, wherein the bypass contactor is in series with the auxiliary set of contacts of the bypass switch.

17. The motor control system of 15, wherein the bypass switch has a first position and a second position;

the first position enabling the variable frequency drive; and the second position isolating the variable frequency drive.

18. The motor control system of claim 15, wherein the first and second set of contacts open before the auxiliary set of contacts cause the closure of the bypass contactor.

19. The motor control system of claim 15, comprising a control relay coupled to the bypass contactor for enabling the bypass contactor.

20. The motor control system of claim 19, wherein contacts of the control relay are coupled in series with the bypass contactor and the control relay is energized upon starting the motor.

21. A system comprising:

a motor drive operable to drive an electric motor;

a bypass contactor electrically in parallel with the motor drive;

a motor control system comprising a manual bypass switch selectively operable to couple the motor drive between a power source and the electric motor, wherein the manual bypass switch is operable to electrically isolate the motor drive from the power source and from the motor, and to close the bypass contactor to couple the motor directly to the power source; and a set of contacts electrically coupled in series with the bypass contactor for opening the contactor before the motor drive is recoupled between the power source and the motor.

* * * * *